United States Patent Office 3,652,483
Patented Mar. 28, 1972

3,652,483
IMPACT-RESISTANT POLYVINYL CHLORIDE COMPOSITION
Takashi Tanaka and Haruhiko Yusa, Iwaki-shi, Japan, assignors to Kureha Kagaku Kogyo Kabushiki Kaisha, Tokyo, Japan
No Drawing. Filed Oct. 1, 1969, Ser. No. 862,931
Claims priority, application Japan, Oct. 4, 1968, 43/72,356
Int. Cl. C08f 29/24, 29/50; C08d 9/08
U.S. Cl. 260—29.7 UP       3 Claims

ABSTRACT OF THE DISCLOSURE

Impact-resistant polyvinyl chloride resin added to MBS polymer composition consisting of cross-linked MBS graft copolymer and polymethylmethacrylate latex.

BACKGROUND OF THE INVENTION

The present invention relates to production of a polyvinyl chloride composition having excellent impact-resistance and workability. More particularly, the invention is directed to provide polyvinyl chloride having high transparency and impact-resistance, as well as facility in working.

The present invention is a further improvement of our copending U.S. application No. 876,920, which is a continuation-in-part application of Ser. No. 570,261 and which discloses the excellent workability, impact resistance, and transparency of a polyvinyl chloride composition containing cross-linked graft copolymers consisting of butadiene, styrene, and methylmethacrylate (MBS).

So far, strenuous efforts have continuously been made by many a researcher to improve the impact-resistance and workability of polyvinyl chloride resins without impairing their excellent physical and chemical properties. In order to remove these inherent defects with polyvinyl chloride resins, i.e., to improve the impact-resistant property thereof, it has been the practice that polyvinyl chloride resin is mixed with MBS or ABS graft copolymers prepared by adsorption-polymerization of a homopolymer of butadiene or a copolymer of butadiene and styrene containing butadiene as the principal constituent with a mixture monomer of styrene-methylmethacrylate, styrene-acrylonitrile, or styrene-acrylonitrile-methylmethacrylate.

Even with the polyvinyl chloride composition thus produced to contain the above-mentioned graft-copolymers, sufficient results have not always been obtained in the manufacture of shaped articles thereof.

The reason for this is that the impact-resistance of polyvinyl chloride resin is governed to a large extent by working conditions, the shape of the articles produced, and various other factors. Particularly, it happens sometimes that the actual destructive strength is not as good as the strength expected from the Izod impact strength tested on a sample material. This is due to various defective portions existing in the shaped articles produced at the time of manufacturing such as, for example, incomplete fusion at the spider-mark portion of a bottle, or fluctuation in wall thickness of the shaped articles resulting from non-uniformity in molten resin material, and so forth.

SUMMARY OF THE INVENTION

It is therefore an object of the present invention to provide an improved polyvinyl chloride composition having excellent impact-resistant property without impairing the other physical and chemical properties inherent therein.

It is another object of the present invention to provide a method for producing such improved polyvinyl chloride composition.

DETAILED DESCRIPTION OF THE INVENTION

The present inventors, as a result of painstaking efforts, have succeeded in obtaining a polyvinyl chloride resin composition, wherein the aforementioned defects of the graft copolymer manufactured by the conventional method have been improved, i.e., impact-resistance and workability of the resin are remarkably high and stable, and shaped articles having excellent transparency and beautiful surfaces can be obtained.

That is, the characteristic feature of the present invention resides in that, in order to further strengthen the mutual action between polyvinyl chloride resin and a cross-linked graft copolymer of butadiene styrene-methylmethacrylate, to stabilize the impacting effect, and to prevent shaped articles of polyvinyl chloride resin from being spoiled in their outer appearance due to migration of the graft copolymer in its molten state to the surface of polyvinyl chloride resin, a limited quantity of methylmethacrylate polymer is intimately mixed with a cross-linked graft copolymer of butadiene-styrene-methacrylate.

In summary, the resin composition according to the present invention consists of the following components:

(1) Polyvinyl chloride resins occupying the largest part of the composition;

(2) A small quantity of an MBS polymer composition obtained by adsorption-polymerization of cross-linked butadiene or butadiene-styrene copolymer latex for imparting impact-resistance to polyvinyl chloride and simultaneously improving workability thereof with a co-monomer of styrene-methylmethacrylate containing therein a cross-linking agent, or by mixing a cross-linked MBS graft copolymer, on which methylmethacrylate containing a crosslinking agent depending on necessity is adsorption-polymerized, with methylmethacrylate polymer having a certain definite solution viscosity.

These two components are intimately mixed together to form the intended resin composition.

In more detail, rubber latex is first obtained by adding, or by not adding, a small quantity of a cross-linking agent to butadiene, or a monomeric mixture of butadiene and styrene with butadiene as the principal constituent. To this rubber latex, an aggregating agent is added, thereby producing aggregated rubber latex having an average grain size of 0.2 to 0.5 micron. Further, a monomeric mixture of styrene-methylmethacrylate containing a small quantity of a cross-linking agent, or methylmethacrylate containing cross-linking agent is adsorption-polymerized on the rubber latex, thereby producing cross-linked graft copolymer of butadiene-styrene-methylmethacrylate. An MBS polymer composition is obtained by further mixing this cross-linked graft copolymer of butadiene-styrene-methylmethacrylate polymer having a certain definite solution viscosity.

Methylmethacrylate is easily polymerizable by ordinary emulsion-polymerization. Polymethylmethacrylate thus-produced and having relatively viscosity of 1.2 to 3.5 measured by dissolving the polymer in a chloroform solution at a concentration of 4 grams of the polymer per 1 litre of chloroform, is found effective for the present invention. Polymethylmethacrylate having its relative viscosity below 1.2, hinders kneadability between graft copolymer and polyvinyl chloride, and contributes less to the impacting effect as well as to the outer appearance of the shaped articles, since the melting vxiscosity thereof is remarkably lower than polyvinyl chloride having a polymerization degree of 500 to 1,300 for ordinary use. When polymethylmethacrylate has a relative viscosity of more than 3.5, the temperature of the resin rises during the kneading of the polyvinyl composition with the consequence that thermal decomposition of polyvinyl chloride is accelerated, the resultant shaped articles are colored, and long, stable extrudability of the resin cannot be obtained. A much more preferable range of the relative viscosity of polymethylmethacrylate to be mixed with polyvinyl chloride is from 1.7 to 3.0. In manufacturing a polymer composition, mixing of the cross-linked MBS graft copolymer of butadiene-styrene-methylmethacrylate and polymethylmethacrylate can be done by an appropriate method such as, for instance, mixing both of them in powder form, or adding polymethylmethacrylate at the time of mixing cross-linked MBS graft copolymer and polyvinyl chloride resin, and so forth. However, the most preferable way of mixing is that both the cross-linked graft copolymer of butadiene-styrene-methylmethacrylate and polymethylmethacrylate are mixed in latex form and then subjected to salting out, or acid precipitation, whereby both become most intimately mixed, and polymethylmethacrylate can be uniformly dispersed in the shaped articles.

Furthermore, it is possible to add methylmethacrylate to the cross-linked graft copolymer of butadiene-styrene-methylmethacrylate and then subject the batch to a post-polymerization, whereby monomeric methylmethacrylate can be easily adsorbed onto the cross-linked graft copolymer latex particles and the graft copolymerization proceeds, so that isolated methylmethacrylate polymer is difficult to produce.

The purpose of the present invention can also be achieved with the graft copolymer per se, according to the above method.

Polyvinyl chloride resin can be produced by various known methods such as, for instance, emulsion polymerization and suspension polymerization, using a homopolymer of vinyl chloride as well as a copolymer containing more than 70% of vinyl chloride and monomeric mono-olefins to be copolymerized therewith. The polyvinyl chloride composition of the present invention is obtained by mixing 99 to 75 parts by weight of these polymers prepared by the above-mentioned method and 1 to 25 parts by weight of an MBS polymer composition obtained by the present invention. The mixing ratio of the cross-linked MBS graft copolymer to polymethylmethacrylate in the MBS polymer composition is 99.5 to 80 parts by weight of the former to 0.5 to 20 parts by weight of the latter.

PREFERRED EMBODIMENTS

In order to enable those skilled in the art to practice the invention, the following examples are presented.

EXAMPLE 1

(a) A cross-linked graft copolymer of butadiene-styrene-methylmethacrylate is prepared in the following processes.

A mixture monomer consisting of 240 g. styrene containing 1.4 g. divinylbenzene, and 200 g. methylmethacrylate is adsorbed onto rubber latex having average grain size of 0.2 to 0.5 micron obtained by polymerizing a mixture monomer consisting of 8000 g. butadiene, 240 g. styrene, 100 g. divinylbenzene in an autoclave of 10-litre capacity provided with agitator. Thereafter, 120 g. methylmethacrylate containing therein 4 g. divinylbenzene is adsorption-polymerized to the batch, thereby obtaining cross-linked graft copolymer latex of butadiene-styrene-methylmethacrylate containing 33% of solid content.

(b) Polymethylmethacrylate is prepared in the following processes.

200 g. methylmethacrylate containing 0.1 g. n-dodecylmercaptan and 0.05 g. diisopropyl-benzene-hydroperoxide, and 800 g. aqueous solution containing 0.05 g. EDTA, 0.05 g. Longarit, 0.003 g. $FeSO_4 \cdot 7H_2O$, and 10 g. sodium oleate are charged into a 2-litre stainless steel autoclave, and reacted in a vacuum at a temperature of 50° C. for 5 hours. Approximately one hour after charging, the polymerization commences, and, after lapse of 1.5 hours, the reaction temperature reaches 55° C. In this way, polymethylmethacrylate latex containing 19.5% concentration of solid content is obtained. The relative viscosity of this polymethylmethacrylate as measured in chloroform solution at a concentration of 4 g./l. at a temperature of 20° C. is 2.40.

To 2,780 g. of the abovementioned cross-linked MBS graft copolymer latex (920 g. as the polymer content), 410 g. of polymethylmethylacrylate latex (80. g. as the polymer) is added, and then both latexes are uniformly mixed. After completion of mixing, the batch is diluted with distilled water so as to bring the concentration of solid content to 15%, thereafter 1% aqueous solution of chloric acid is gradually added to the diluted latex mixture to subject it to acid-precipitation, and then latex particles are coagulated by heat-treating the batch at 80° C. Subsequently, the batch is filtered for removing water and dried in dry air heated to 70° C., whereby an MBS polymer composition consisting of 92 parts by weight of cross-linked MBS graft copolymer and 8 parts by weight of methylmethacrylate is obtained.

15 parts by weight of this MBS polymer composition in powder and 85 parts by weight of polyvinyl chloride having D.P. 800 and containing therein 2 parts by weight of dibutyl tin laurate are mixed together and kneaded by a roll mill for 3 minutes at 160° C., after which and the kneaded mixture is pressed for 5 minutes under pressure of 150 kg./cm.$^2$ at a temperature of 200° C. to form a plate of 6 mm. thick. The plate is tested for V-notch Izod strength, and further subjected to measurement for light transparency in comparison with a plate of 3 mm. prepared by the same working condition. Furthermore, a bottle of 500 ml. capacity having 25 g. graduations is produced by an extruder (working condition $L/D=20$; compression ratio of 4.0; number of screw revolution of 45 per minute; and temperature at the tip of the dice of 208° C.). The bottle is first observed for outer appearance, and then tested for its actual destructive resistance by filling the bottle with water at 20° C. and then dropping it from varying heights to find out an average height of destruction according to the accumulated dropping test method. The results are shown in the following Table 1.

TABLE 1

| | Outer appearance of the bottle | Average height of destructive dropping* (cm.) | Izod impact strength** (kg.-cm./cm.²) | Transparency*** (T$_p$ percent) |
|---|---|---|---|---|
| Example 1 | Good gloss | 250 | 75 | 82.5 |

*Average value of 25 bottles.
**ASTM D-256, V-notch measurement temperature of 20° C.
***JIS 6714.

As is clear from above table, the bottle exhibits good outer appearance, and the average height of destructive dropping is considerably high.

EXAMPLES 2–6

Except for the mixing ratio of the cross-linked MBS graft copolymer latex and polymethylmethacrylate latex, polyvinyl chloride containing MBS polymer composition was produced by exactly same process as Example 1 and tested for its properties. The results are shown in Table 2.

TABLE 2

| | Polyvinyl chloride and the MBS polymer composition | | | | Properties of the shaped articles | | | |
|---|---|---|---|---|---|---|---|---|
| | Polyvinyl chloride (D.P. 800) (part by weight) | Cross-linked MBS graft Copolymer (part by weight) | Polymethyl-methacry-late (part by weight) | Polymethyl-methacry-late/MBS polymer composition ×100 | Outer appearance of bottle | Average height of destruction (cm.) | Light transparency ($T_D$ percent) | Izod impact strength (kg.-cm./cm.$^2$) |
| Example: | | | | | | | | |
| 2 | 85 | 14.8 | 0.2 | 1.33 | Slight gloss | 225 | 81.0 | 82 |
| 3 | 85 | 14.3 | 0.7 | 4.66 | ....do.... | 250 | 82.0 | 80 |
| 4 | 85 | 13.8 | 1.2 | 8.0 | Good gloss | 260 | 82.5 | 75 |
| 5 | 85 | 12.7 | 2.3 | 15.3 | ....do.... | 255 | 82.3 | 75 |
| 6 | 85 | 12.0 | 3.0 | 20.0 | ....do.... | 250 | 82.5 | 70 |
| Comp. Ex. 1 | 85 | 15.0 | 0 | 0 | Transparent but no gloss | 205 | 81.0 | 80 |
| Comp. Ex. 2 | 85 | 11.3 | 3.7 | 24.6 | Good gloss | 190 | 82.5 | 21 |

As seen from the above Table 2, the outer appearance and transparency of the bottles obtained by Examples 2 to 6 are excellent; and, contrary to what is expected from Izod impact strength, the actual destructive strength thereof is found to be superior to the comparative Example 1 not added with polymethylmethacrylate at all. This is probably due to the fact that the mutual action between the cross-linked MBS graft copolymer and polyvinyl chloride becomes stronger with the result that the rough surface disappears, and, further, that as the result of uniformity in the molten resin being improved, the defects in the shaped articles which become the cause for the destruction are reduced.

It is to be noted that when the quantity of polymethylmethacrylate in MBS polymer becomes more than 20% my weight, the strength of the shaped articles lowers considerably, although the outer appearance thereof is actually good and lustrous.

EXAMPLES 7-9

Except for changing the adding quantity of a n-dodecylmercaptan to be added at the time of polymerization as a controlling agent for degree of polymerization and for using polymethylmethacrylate latex, the solution viscosity of which is adjusted, polyvinyl chloride containing an MBS polymer composition is obtained by exactly same manner as that of Example 1. The properties of the polymer are shown in the following Table 3.

TABLE 3

| | Solution viscosity ($\eta$ rel.) of polymethyl-methacrylate | Outer appearance of the bottle | Average height of destructive dropping (cm.) | Light transparency ($T_D$ percent) | Izod impact strength (kg.-cm./cm.$^2$) | Temperature at tip end of dice (° C.) |
|---|---|---|---|---|---|---|
| Example: | | | | | | |
| 7 | 1.60 | Good gloss | 235 | 81.0 | 77 | 208 |
| 8 | 1.90 | ....do.... | 240 | 82.0 | 74 | 208 |
| 9 | 2.80 | ....do.... | 255 | 82.5 | 72 | 210 |
| 10 | 2.40 | ....do.... | 250 | 82.5 | 75 | 208 |
| Comp. Ex. 3 | 1.20 | Transparent but no gloss | 200 | 81.5 | 76 | 207 |
| Comp. Ex. 4 | 3.85 | Good gloss but colored to some extent | 220 | 82.6 | 75 | 218 |

When the solution viscosity of polymethylmethacrylate becomes less than 1.2, no improvement can be seen in the outer apperance, or in the dropping strength of the shaped articles. On the other hand, when the solution viscosity is more than 3.5, the outer appearance of the shaped articles is good and lustrous; however, temperature of the molten resin becomes higher, thus causing the thermal decomposition of polyvinyl chloride, and the bottle is colored to some extent.

EXAMPLE 10

Cross-linked MBS polymer latex and polymethylmethacrylate latex obtained in Example 1 are individually subjected to acid precipitation, thereby obtaining the resins in powder form. These powdery resins are mixed wth polyvinyl chloride at the same mixture ratio as in Example 1 to obtain a polyvinyl chloride composition.

When both latexes are subjected to acid precipitation and compared with those mixed with polyvinyl chloride, the sheet obtained (T-die sheet of 0.1 mm. thick) possesses satisfactory properties in respect to outer appearance, transparency, bottle dropping strength, etc. although the number of fish-eyes somewhat increases. The results are as follows:

TABLE 4

| Example | Outer appearance of the bottle | Average height of destructive dropping (cm.) | Transparency ($T_D$ percent) | Izod impact strength (kg.-cm./cm.$^2$) | Number of fish-eyes |
|---|---|---|---|---|---|
| 10 (powder mixing). | Good gloss | 225 | 82.0 | 72 | 35 |
| 1 (latex mixing). | ....do.... | 250 | 82.5 | 75 | 15 |

What we claim is:

1. A polyvinyl chloride composition having improved impact-resistance and transparency consisting of 99 to 75 parts by weight of a polyvinyl chloride resin having a degree of polymerization of from 500 to 1,300, and from 1 to 25 parts by weight of a cross-linked graft-copolymer latex of a graft copolymer selected from the group consisting of styrene and methyl methacrylate grafted onto polybutadiene, styrene and methyl methacrylate grafted onto a butadiene-styrene copolymer, and methyl methacrylate grafted onto a butadiene-styrene copolymer, said graft copolymer latex being further mixed with a small quantity of a polymethylmethacrylate latex having a relative viscosity of from 1.2 to 3.5 as measured in chloroform at a concentration of 4 g./l. at a temperature of 20° C.

2. In a method of producing an impact-resistant polyvinyl chloride resin composition by mixing therewith a cross-linked graft copolymer selected from the group consisting of styrene and methyl methacrylate grafted onto polybutadiene; styrene and methyl methacrylate grafted onto a butadiene styrene copolymer, and methyl methacrylate grafted onto a butadiene-styrene copolymer, the improvement which comprises adding polymethylmethacrylate latex having a relative viscosity of 1.2 to 3.5 measured in chloroform at a concentration of 4 g./l. at 20° C. in an amount of 0.5 to 20 parts by weight of said latex with respect to 99.5 to 80 parts by weight of said cross-linked graft copolymer.

3. A method of producing a polyvinyl chloride resin composition of improved impact resistance and transparency, which comprises:
   (a) preparing a cross-linked graft copolymer latex of a graft copolymer selected from the group consisting of styrene and methyl methacrylate grafted onto polybutadiene, styrene and methyl methacrylate grafted onto a butadiene-styrene copolymer, and methyl methacrylate grafted onto a butadiene-styrene copolymer;

(b) uniformly mixing 0.5 to 20 parts by weight of a polymethylmethacrylate latex having a relative viscosity of 1.2 to 3.5 as measured in chloroform at a concentration of 4 g./l. at 20° C. with 99.5 to 80 parts by weight of said cross-linked graft copolymer latex;

(c) subjecting said latex mixture to salting-out or acid precipitation; and (d) intimately mixing and kneading 1 to 25 parts by weight of said latex mixture with 99 to 75 parts by weight of a homopolymer or copolymer of a polyvinyl chloride resin.

References Cited

UNITED STATES PATENTS

| 3,288,886 | 11/1966 | Himei et al. | 260—876 |
| 3,513,226 | 5/1970 | Hoffa | 260—876 |

FOREIGN PATENTS

| 699,357 | 12/1964 | Canada | 260—876 |

SAMUEL H. BLECH, Primary Examiner

W. J. BRIGGS, Sr., Assistant Examiner

U.S. Cl. X.R.

260—29.7 UA, 29.7 T, 876 R, 884, 879, 885, 880 R, 886, 890, 899, 901